United States Patent
Sicard et al.

(10) Patent No.: US 11,692,977 B2
(45) Date of Patent: Jul. 4, 2023

(54) TIME-CORRECTED GAIN METHOD IMPLEMENTED IN AN ULTRASONIC SCANNER

(71) Applicant: TECSCAN SYSTEMS INC., St-Bruno-de-Montarville (CA)

(72) Inventors: Rene Sicard, Chambly (CA); Nicolas Grimard, Boucherville (CA)

(73) Assignee: TECSCAN SYSTEMS INC., Saint-Bruno-de-Montarville (CA)

( * ) Notice: Subject to any disclaimer, the term of this patent is extended or adjusted under 35 U.S.C. 154(b) by 206 days.

(21) Appl. No.: 17/149,334

(22) Filed: Jan. 14, 2021

(65) Prior Publication Data

US 2021/0341435 A1 Nov. 4, 2021

Related U.S. Application Data

(60) Provisional application No. 63/017,949, filed on Apr. 30, 2020.

(51) Int. Cl.
| | |
|---|---|
| *G01N 29/44* | (2006.01) |
| *G01N 29/06* | (2006.01) |
| *G01N 29/07* | (2006.01) |
| *G01N 29/265* | (2006.01) |

(52) U.S. Cl.
CPC ....... *G01N 29/4463* (2013.01); *G01N 29/069* (2013.01); *G01N 29/07* (2013.01); *G01N 29/265* (2013.01); *G01N 29/449* (2013.01); *G01N 2291/011* (2013.01); *G01N 2291/0289* (2013.01); *G01N 2291/044* (2013.01)

(58) Field of Classification Search
CPC ............ G01N 29/4463; G01N 29/069; G01N 29/449; G01N 2291/011; G01N 2291/0289; G01N 2291/044; G01N 29/07; G01N 29/265
See application file for complete search history.

(56) References Cited

U.S. PATENT DOCUMENTS

| | | | |
|---|---|---|---|
| 8,497,986 B2 * | 7/2013 | Ochiai | G01N 29/043 356/502 |
| 10,338,036 B2 * | 7/2019 | Grimard | G01N 29/4427 |
| 2012/0101764 A1 * | 4/2012 | McKeon | G01H 17/00 702/103 |

* cited by examiner

*Primary Examiner* — Roy Y Yi
*Assistant Examiner* — Geoffrey T Evans
(74) *Attorney, Agent, or Firm* — BCF LLP

(57) ABSTRACT

An ultrasonic scanner acquires a gain profile including gain values for corresponding travel times in ultrasonic echoes reflected by a reference object. An ultrasonic probe signal is sent toward a test object. In response, an ultrasonic echo reflected by the test object is received at the scanner. A time of arrival of the echo is estimated. The gain profile is aligned with the echo according to the estimated time of arrival of the echo. The echo is amplified using the aligned gain profile and the amplified echo is digitized before being attenuated using the aligned gain profile. An actual time of arrival of the echo is calculated based on the attenuated digitized echo. The gain profile is re-aligned with the attenuated digitized echo according to the actual time of arrival of the echo. The attenuated digitized echo is re-amplified using the re-aligned gain profile to obtain a gain-corrected echo.

20 Claims, 10 Drawing Sheets

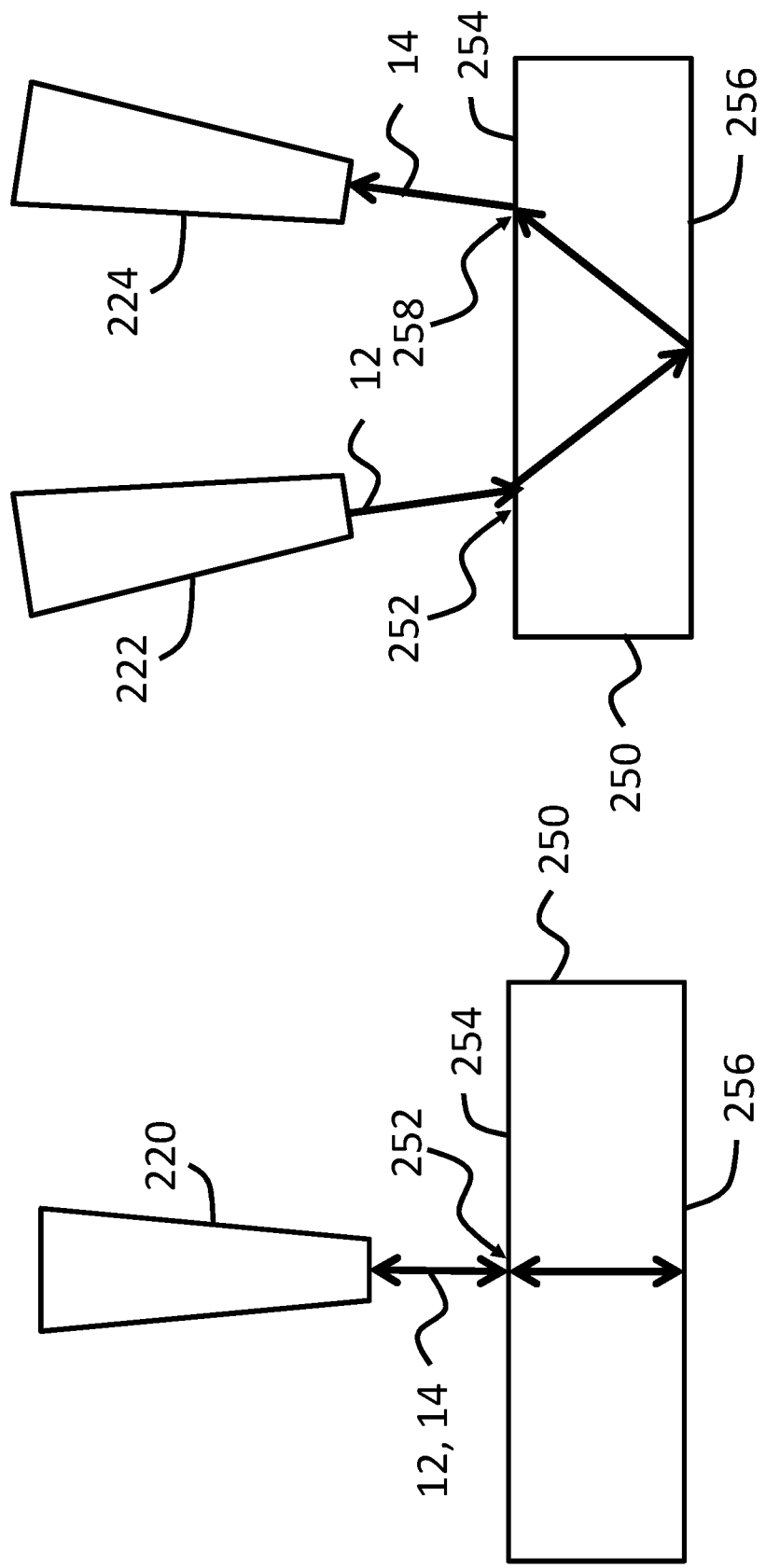

ated by a transducer that converts an electrical signal into the ultrasonic wave. The ultrasonic wave is directed toward an impinging surface of an object being scanned. When testing the material in pulse-echo mode, the same transducer is used to convert the electrical pulse into the ultrasonic wave, and then to convert a received ultrasonic echo back to an electrical signal. Distinct transducers are used for emitting and receiving ultrasonic waves when testing a material in transmission mode or in so-called 'pitch-and-catch' mode. In pulse-echo mode, waves travel into the material of the object being scanned and are reflected back to the transducer as they encounter a reflector present in the form of an acoustic impedance change. The amplitude of the waves being received by the transducer is a function of the distance travelled and of the characteristics of the reflector, as well as a function of the transducer and of acoustic properties of the propagation media. The same principle applies to pitch-and-catch mode, the only difference being that a second probe receives the reflected ultrasonic waves.

When calibrating the sensitivity of an ultrasonic instrument for inspection in pulse-echo mode or in pitch-and-catch mode, it is common practice to calibrate for a specific reflector type and size. As an example, flat bottom holes (FBH) machined at different depth inside a reference object or a set of reference objects are typically inspected to define the ultrasonic echo amplitude response of the same FBH as a function of depth in the material. The resulting information is a list of signal amplitudes recorded at various depths, forming a distance-amplitude correction (DAC) curve. When testing for flaws in a test object other than the reference object or objects, the DAC provides reference amplitudes to set detection thresholds for the return signal as a function of depth.

Alternatively, the DAC may be used to calculate a gain profile that is, in turn, used to amplify the ultrasonic signal as a function of depth in order to normalize the ultrasonic echoes from the FBH as a function of depth inside the tested material. A time-corrected gain technique (TCG) is used for this purpose.

In some applications, the probe may be placed in direct contact with the reference object and then with the test object. In the context of contact inspection, the time of arrival of the ultrasonic probe signal at the surface of the material can be easily established, as it either corresponds to the onset of the ultrasonic wave if the probe is directly in contact with the material, or the time corresponding to the interface between the probe, a delay line and the material. In both cases, this time is a fixed value.

In other applications, the object being scanned and the probe are immersed in a couplant fluid, for example water, and the ultrasonic probe signal travels through the couplant fluid before reaching the surface of the object, the ultrasonic echo also travelling back through the couplant fluid before reaching a detector. In the context of immersion inspection, the delay line, sometimes present in contact inspection, is replaced by the couplant fluid. Starting the synchronization at the interface between the couplant fluid and the tested material is more complicated than for contact inspection because the travel time of the ultrasonic wave may vary when moving the probe. This time is not a priori known, for example due to the fact that the movement of the ultrasonic probe may not be perfectly parallel to the scanned object.

Precise synchronization of the gain profile as a function of the real time of arrival of an ultrasonic echo is difficult to achieve because of a lack of knowledge of the travel time of the ultrasonic wave in the couplant fluid. Numerical amplification methods are synchronized on the measured travel time but provide poor signal-to-noise ratio (SNR) of ultrasonic echo signals. Also, analog amplification is synchronized on an approximated travel time and is imprecise due to imperfections of amplifier hardware. Therefore, there is a need for techniques that enable precise synchronization of a gain profile with a time of arrival of an ultrasonic echo while maintaining a precise amplification level and a good SNR of ultrasonic echo signals.

SUMMARY

According to the present disclosure, there is provided a time-corrected gain method implemented in an ultrasonic scanner, the method comprising:

acquiring a gain profile including a plurality of gain values for a corresponding plurality of travel times in ultrasonic echoes reflected by a reference object;

sending an ultrasonic probe signal toward a test object;

receiving an ultrasonic echo reflected by the test object;

estimating a time of arrival of the ultrasonic echo;

aligning the gain profile with the ultrasonic echo according to the estimated time of arrival of the ultrasonic echo;

amplifying the ultrasonic echo using the aligned gain profile;

digitizing the amplified ultrasonic echo;

attenuating the digitized ultrasonic echo using the aligned gain profile;

calculating an actual time of arrival of the ultrasonic echo based on the attenuated digitized ultrasonic echo;

re-aligning the gain profile with the attenuated digitized ultrasonic echo according to the actual time of arrival of the ultrasonic echo; and re-amplifying the attenuated digitized ultrasonic echo using the re-aligned gain profile to obtain a gain-corrected ultrasonic echo.

According to the present disclosure, there is also provided an ultrasonic scanner, comprising:

a probe adapted to send an ultrasonic probe signal toward an impinging surface of a test object;

a detector adapted to receive an ultrasonic echo reflected by the test object;

a probe support adapted to position the probe and the detector in view of the impinging surface of the test object;

an analog amplifier adapted to:
  receive a gain profile including a plurality of gain values for a corresponding plurality of travel times in ultrasonic echoes reflected by a reference object,
  align the gain profile with the ultrasonic echo according to an estimated time of arrival of the ultrasonic echo, and
  amplify the ultrasonic echo using the aligned gain profile;

an analog to digital converter adapted to digitize the amplified ultrasonic echo; and a controller operably connected to the probe, to the detector, to the probe support, to the analog amplifier, and to the digital to analog converter, the controller being configured to:
  implement a time gate to estimate the time of arrival of the ultrasonic echo at the detector,
  provide the gain profile and the estimated time of arrival of the ultrasonic echo to the analog amplifier,
  cause the probe to send the ultrasonic probe signal toward the impinging surface of the test object,
  receive the digitized amplified ultrasonic echo from the analog to digital converter,
  align the gain profile with the digitized ultrasonic echo according to the estimated time of arrival of the ultrasonic echo,
  attenuate the digitized ultrasonic echo using the aligned gain profile,
  calculate an actual time of arrival of the ultrasonic echo based on the attenuated digitized ultrasonic echo,
  re-align the gain profile with the attenuated digitized ultrasonic echo according to the actual time of arrival of the ultrasonic echo, and
  re-amplify the attenuated digitized ultrasonic echo using the re-aligned gain profile to obtain a gain-corrected ultrasonic echo.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 4a is schematic view of an example of an ultrasonic probe operating in pulse-echo mode;

FIG. 4b is schematic view of an example of ultrasonic probes operating in pitch-and-catch mode;

Like numerals represent like features on the various drawings.

DETAILED DESCRIPTION

Various aspects of the present disclosure generally address one or more of the problems related to the lack of precise synchronization of a gain profile with a time of arrival of an ultrasonic echo, to imprecisions in analog amplification techniques, and to poor signal-to-noise ratio (SNR) of ultrasonic echo signals.

The following terminology is used throughout the present disclosure:

Test object: any object for which it is desired to obtain a physical analysis.

Reference object: an object or a set of objects similar in geometry to the test object; as an example, the test object and the reference object may be similar items, the test object having potential manufacturing flaws or flaws due to wear and tear, the reference object being new. One or more reference objects similar to a same test object may be used.

Pulse-echo mode: signal acquisition mode in which a pulse is emitted by the probe and a reflected signal is acquired by the same probe.

Pitch-and-catch mode: signal acquisition mode in which a pulse is emitted by an emitting probe and a reflected signal is acquired by a separate receiving probe.

Probe: a physical device capable of sending and/or receiving a signal, for example an ultrasonic probe signal, towards an object being scanned.

Data acquisition unit: a device including one or more probes, a mechanical device capable of moving the probe, and components adapted for sending probe signals as well as receiving and treating echoes.

Non-destructive testing: a material evaluation technique that does not cause damage to an object under test.

C-scan image: an image constructed based on information from signals resulting from scanning of an object, the signals being obtained at a plurality of scanning points on the surface of the object.

Generally speaking, the present disclosure introduces techniques using a stored gain profile and a combination of analog and numerical amplifications to obtain precise synchronization of a time-varying analog amplification with a time of arrival of an ultrasonic echo while preserving a good signal-to-noise ratio (SNR) of ultrasonic echo signals. In an embodiment, the present disclosure presents a time-corrected gain (TCG) method implemented in an ultrasonic scanner. In another embodiment, the present disclosure presents an ultrasonic scanner implementing the TCG method. The disclosed method and ultrasonic scanner can be used for various applications, including without limitation for non-destructive testing purposes.

Quantization noise is a noise originating from an analog to digital conversion of a signal and is therefore not amplified by an analog receiver. It is however amplified by a numerical amplification. In the present disclosure, analog to digital conversion is performed after analog amplification and before numerical amplification. The impact of numerical amplification on the ultrasonic signal is equivalent to adding noise to the signal.

Figure 1:
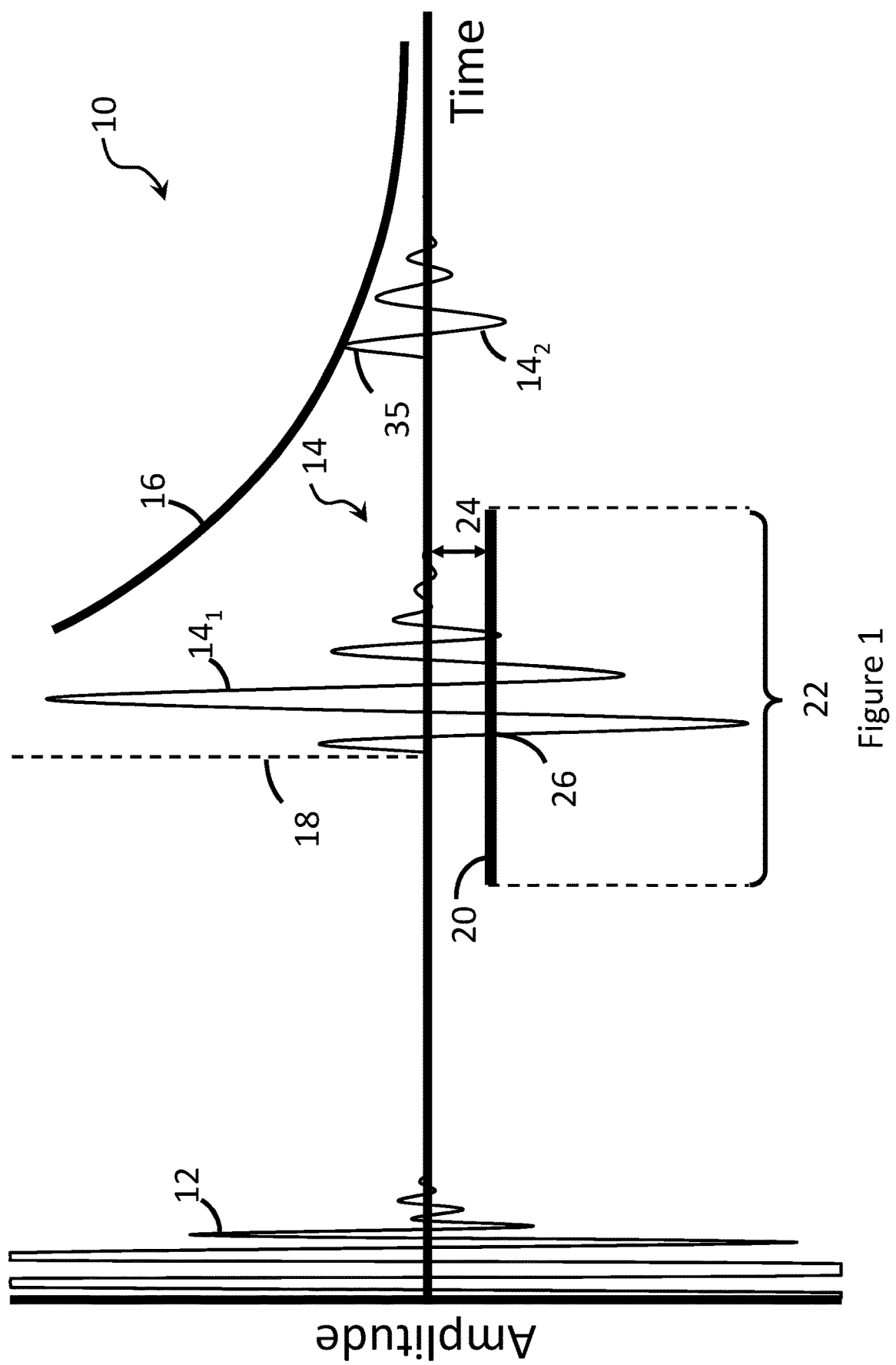
FIG. 1 is a graph showing amplitudes of an ultrasonic signal as a function of time according to an embodiment.

Referring now to the drawings, FIG. 1 is a graph showing amplitudes of an ultrasonic signal as a function of time according to an embodiment. On a graph 10, a vertical axis shows an amplitude (dimensionless) as a function of time (dimensionless) of an electrical pulse 12, applied to a probe to generate ultrasonic waves, and of an ultrasonic echo 14 from a test object. For simplicity, the electrical pulse 12 will be identified from this point on as an ultrasonic probe signal 12 emitted by the probe toward the test object. The probe and the test object are shown on later Figures. Both the probe and the test object are immersed in a couplant fluid, for example water, so both the ultrasonic probe signal 12 and the ultrasonic echo 14 also transit through the couplant fluid. The ultrasonic echo 14 includes a first echo wave $14_1$ and a second echo wave $14_2$. The first echo wave $14_1$ is a reflection of the ultrasonic probe signal 12 on a front surface of the test object. The second echo wave $14_2$ is caused when the ultrasonic probe signal 12 meets an acoustic impedance discontinuity within the test object, either reaching a rear surface of the test object or a defect or other artifact within the test object. The ultrasonic echo 14 may include a single echo wave or a plurality of echo waves.

A distance-amplitude correction (DAC) curve 16 is shown on the graph 10. The DAC curve 16 represents an expected signal attenuation within the test object, as determined for example using measurements on a reference object of a same nature and construction as the test object, the reference object being free of any natural defect but containing artificial reflectors such as flat bottom holes (FBH). In this and the following paragraphs, the term "reference object" is used in the singular form for simplicity and without limiting the generality of the present disclosure. In a practical realization, the use of one or more reference objects is contemplated. The farther an impedance discontinuity m is located within the reference or test object, the greater the attenuation of the echo wave $14_m$ reflected from this impedance discontinuity m, this attenuation being expressed on the DAC curve 16. On FIG. 1, the DAC curve 16 is illustrative only and is provided for explanation purposes.

The graph 10 shows an onset 18 (dashed line) of the ultrasonic echo 14. A distance in the couplant fluid between the probe that emits the ultrasonic probe signal 12 and the test object may not be defined with precision and may vary as the probe moves about in front of the test object. Consequently, the time delay between the emission of the ultrasonic probe signal 12 and the onset 18 of the ultrasonic echo 14 may not be a priori known. Although not shown on FIG. 1, some noise is added to the ultrasonic echo 14. This noise prevents identifying with precision the actual time of the onset 18. A time gate 20 is defined with a duration 22 that corresponds to an expected time range for the onset 18 of the ultrasonic echo 14. The time gate 20 is also defined with an amplitude 24 of the ultrasonic echo 14 that is expected to be reached soon after the onset 18. A value of the amplitude 24 is selected to be sufficiently large so that it is not likely to react to ambient noise between the probe and the surface of the test object, being not too large to ensure that the ultrasonic echo 14 is not likely to be undetected. As illustrated, the amplitude 24 is shown as a negative value, but the amplitude 24 may also have a positive value. At a point in time, soon after the onset 18, the ultrasonic echo 14 reaches the amplitude 24 of the time gate 20. This point in time is deemed a time of arrival (TOA) 26 of the ultrasonic echo 14 from the reference object for defining the DAC curve 16; the same amplitude 24 will also be used to obtain an estimated TOA (called $TOA_E$) of the ultrasonic echo 14 from the test object. In an alternate embodiment, the estimated TOA may be obtained from a time of a first or highest peak exceeding the amplitude 24 at the same polarity as the time gate 20. In another alternate embodiment, the estimated TOA may be obtained by a convolution/deconvolution analysis of the ultrasonic echo 14.

Figure 2:
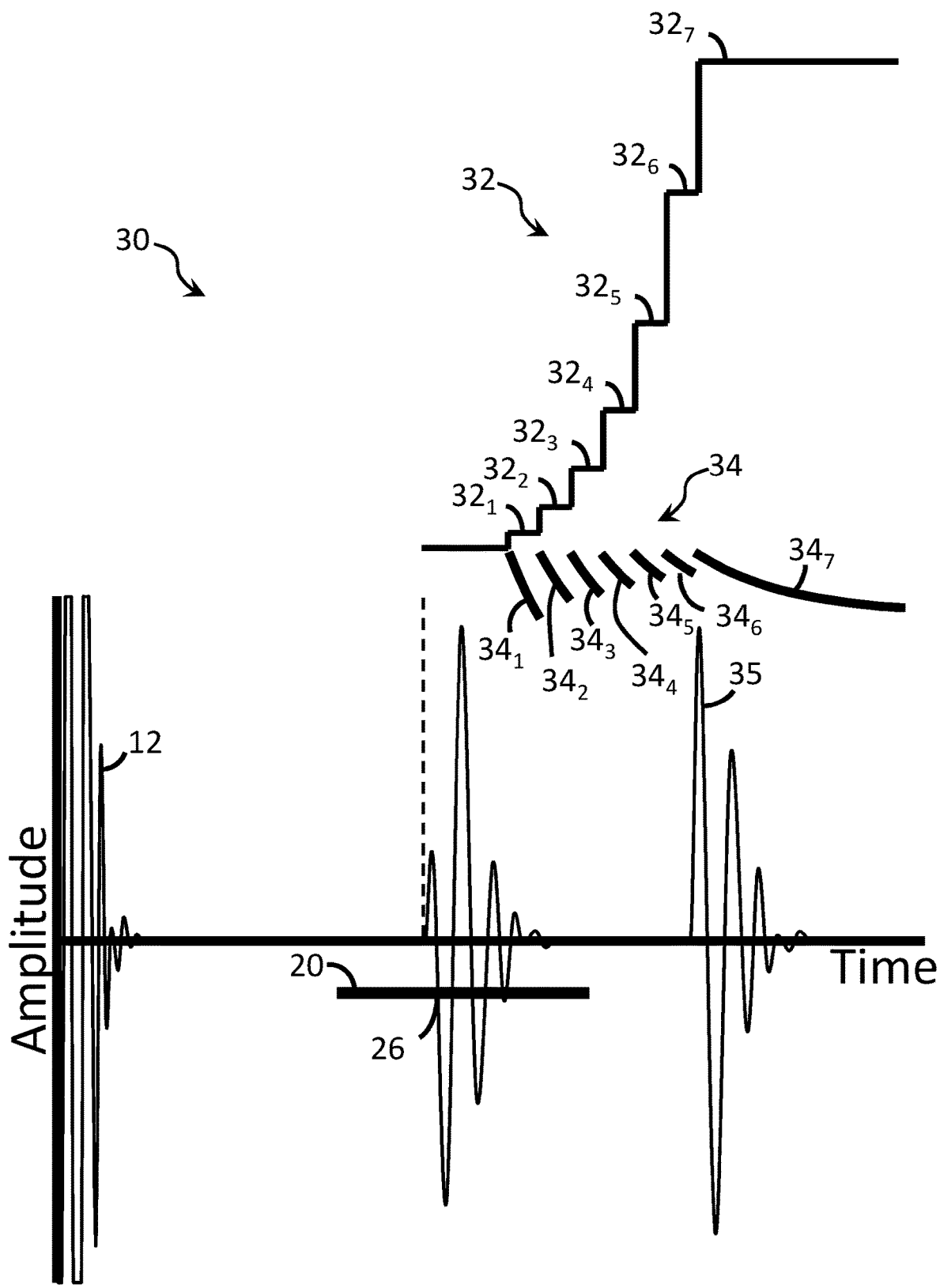
FIG. 2 is a graph showing amplitudes of the ultrasonic signal of FIG. 1 following its amplification using a gain profile.

Amplification of the ultrasonic echo 14 may be performed using a time-corrected gain (TCG) technique, in which various points in time of the ultrasonic echo 14 are amplified using corresponding gain values in a gain profile. FIG. 2 is a graph showing amplitudes of the ultrasonic signal of FIG. 1 following its amplification using a gain profile. On a graph 30, using the TCG technique, each point of the ultrasonic echo 14 of FIG. 1 is amplified by a corresponding gain $32_1 \ldots 32_i$ that is inversely proportional to the amplitude of the DAC curve 16 for a given time delay from the TOA 26. A gain profile 32 that is an inverse of the DAC curve 16 is used to amplify the ultrasonic echo 14 so that amplitudes at each point of the thus amplified ultrasonic echo are the same as if the DAC curve 16 was a horizontal straight line, approximated as 34 on FIG. 2. In practice, the gain profile 32 may comprise a discrete number of gains distributed along the time axis; the DAC curve 16 is effectively replaced by a succession 34 of shorter lines $34_1 \ldots 34_i$ with limited variation of their gains. It may be observed that a first peak 35 of the second echo wave $14_2$ is much amplified when compared to what is shown on FIG. 1. Although FIG. 2 shows a modest number of gains $32_1 \ldots 32_7$, an implementation of the TCG technique may use a larger number of gains $32_1 \ldots 32_i$ that each apply over a shorter time period following the time gate 20. A magnitude of each gain $32_1 \ldots 32_i$ increases at an exponential rate; only a few gains $32_1 \ldots 32_i$ are shown on FIG. 2 in order to illustrate the TCG technique while maintaining a reasonable scale on the graph 30. On FIG. 2, the gain profile 32 and the gains $34_1 \ldots 34_i$ are illustrative only and are provided for explanation purposes.

Generally speaking, the gain profile is built from the DAC curve, which represents the variation of the amplitude of the echo reflected on a given reference reflector, for example an FBH, as a function of depth. As a non-limiting example, a DAC curve may be constructed using three FBHs of the same diameter located at three different depths on the reference object. The DAC curve sets a detection threshold, not only at the depths of the reference FBH, but also at intermediate depths interpolated on the DAC curve.

The gain profile is a different expression of the DAC curve. The gain profile is a curve covering the same range of depths as the DAC curve. The gain profile represents the amplification necessary to normalize the amplitude of the echoes of a given reflector (the same as for the DAC curve) as a function of time.

Continuing with the same non-limiting example, a DAC curve may be built from three points as shown in Table I:

TABLE I

| Depth | Amplitude of the echo |
|---|---|
| 10 mm | 800 mV |
| 15 mm | 400 mV |
| 20 mm | 200 mV |

Using the first depth as the reference, the corresponding gain profile would be as shown in Table II.

TABLE II

| Depth | Gain |
|---|---|
| 10 mm | 0 dB |
| 15 mm | 6 dB |
| 20 mm | 12 dB |

By activating a TCG to apply this gain profile, scanning the same FBHs having served to build the DAC curve would result in an amplitude of 800 mV regardless of depth.

On FIG. 2, the gain profile 32 corresponding to the DAC curve 16 is first determined using measurements taken on the reference object. The gain profile 32 includes a plurality of gain values $32_1 \ldots 32_i$ that increase with increased time delays between the sending of the ultrasonic probe signal 12 and the receiving of each point on the ultrasonic echo 14. A proper time alignment of the gain profile 32 using a correct determination of the TOA 26 allows a proper application of the gain profile 32 on the ultrasonic echo 14 received from the test object.

Initially, the determination of the TOA 26 of the ultrasonic echo 14 received from the test object lacks precision, at least in part due to external noise, for example thermal noise, added to the ultrasonic echo 14, and at least in part because monitoring of the amplitude 24 of the time gate 20 is achieved numerically on a digitized version of the ultrasonic echo 14. The TOA 26 may be determined with good precision after analog to digital conversion of the signals. For an analog time-corrected gain amplification, the TOA 26 may be approximated from previous ultrasonic echoes 14. Considering that the DAC curve 16 and the corresponding gain profile 32 have exponential characteristics, a minor error on the definition of the TOA 26 of the ultrasonic echo 14 may lead to a shift of the gain profile 32 from its true position and cause a significant impact of the amplification of the ultrasonic echo 14. The TOA 26 being approximate, the gain profile 32 may not be perfectly synchronized with the ultrasonic echo 14 coming from the surface of the test object.

Figure 3:
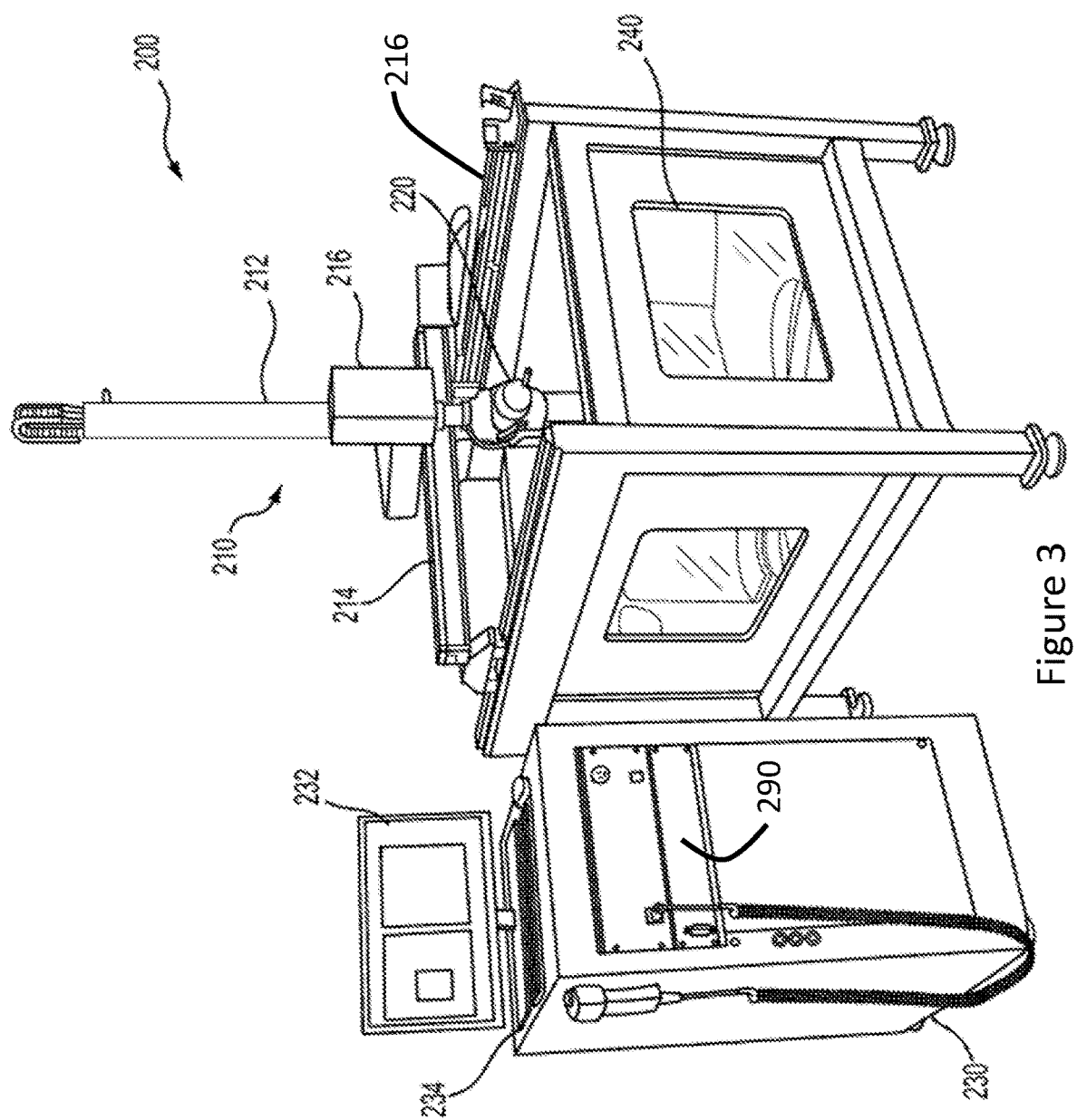
FIG. 3 is a perspective view of an ultrasonic scanner according to an embodiment.

FIG. 3 is a perspective view of an ultrasonic scanner according to an embodiment. An ultrasonic scanner 200 as illustrated is one of many possible realizations of a scanning apparatus capable of implementing the TCG technique. Some of the shown components of the ultrasonic scanner 200 are optional and may not be present in some embodiments.

The ultrasonic scanner 200 comprises scanning hardware 210, a data acquisition unit 290, and a controller 230. As illustrated, the scanning hardware 210 includes a probe 220 held within a basin 240 that may be filled with a couplant fluid, for example water, air, or another fluid, the couplant fluid forming a controlled environment for transmission of probe signals. The scanning hardware 210 also includes a vertical member 212 and two horizontal members 214 and 216. The scanning hardware 210 as shown is capable of moving the probe 220, under control of the controller 230, along three (3) axes by raising or lowering the vertical member 212, moving the vertical member 212 laterally along a length of the horizontal beam 214, and by moving the horizontal beam 214 longitudinally along a length of the basin 240 on the horizontal beam 216. The vertical member 212 and the horizontal beams 214 and 216 are moved by commands from the controller 230. The ultrasonic scanner 200 can thus scan an object over a three-dimensional (3D) space. The scanning hardware 210 and the probe 220 are connected by wires (not shown) to the data acquisition unit 290 and to the controller 230. The controller 230 includes a monitor 232 and a keyboard 234 allowing an operator to control the ultrasonic scanner 200 and its components.

The controller 230 controls a scanning motion of the probe 220 and causes the probe 220 to send ultrasonic probe signals to obtain a plurality of measurements for a corresponding plurality of scanning points on an impinging surface of the reference object. The controller 230 also controls a scanning motion of the probe 220 and causes the probe 220 to send ultrasonic probe signals to obtain a plurality of measurements for a corresponding plurality of scanning points on an impinging surface of the test object. Finally, the controller 230 implements the TCG technique using the gain profile to correct each of the plurality of measurements for each scanning point on the surface of the test object.

The ultrasonic scanner 200 may comprise a memory (shown on a later Figure) in which the controller 230 stores and reads the gain profile. An image generator constructs an image, for example a C-scan image, of the test object using amplitudes or times of arrival of echo signals sampled from the corrected measurements obtained for the plurality of scanning points on the surface of the test object. A visual display such as the monitor 232 may show the image. Alternatively, the image may be printed on a printer (not shown), or an output port (not shown) of the controller 230 may transmit data representing the image. Individual corrected waveforms may also be displayed and analyzed for defect detection. It may be noted that instead of a single probe 220, the ultrasonic scanner 200 may comprise a plurality of probes, for example a probe array, and the controller 230 may calculate and store a plurality of gain profiles for the corresponding plurality of probes.

FIG. 4a is a schematic view of an example of an ultrasonic probe operating in pulse-echo mode. The probe 220 introduced in the description of ultrasonic scanner 200 is configured to operate in pulse-echo mode and is thus capable of emitting ultrasonic probe signals 12 toward a point 252 on a front surface 254 of an object, for example a reference object 250, and detecting ultrasonic echoes 14 originating from a rear surface 256 and exiting from the same point 252 on the front surface 254 of the reference object 250. FIG. 4b is schematic view of an example of ultrasonic probes operating in pitch-and-catch mode. An emitting probe 222 is configured to emit ultrasonic probe signals 12 toward the point 252 on the front surface 254 of the object. The ultrasonic probe signal 12 travels within the object and is reflected on the rear surface 256 of the object. The resulting echo is emitted from a point 258 on the front surface of the object and reaches a receiving probe 224, which acts as a detector. Although not shown on FIGS. 4a and 4b, it may be observed that instead of originating from the rear surface 256, the ultrasonic echoes may originate from an internal reflector (a flat bottom hole of the reference object 250, or an internal defect of a test object) located within the object, between the front surface 254 and the rear surface 256.

FIGS. 5a, 5b, 5c and 5d show a flowchart showing operations of a time-corrected gain method implemented in an ultrasonic scanner according to an embodiment. On FIGS. 5a, 5b, 5c and 5d, a sequence 500 comprises a plurality of operations, some of which may be executed in variable order, some of the operations possibly being executed concurrently, some of the operations being optional.

At operation 505, a gain profile is defined or otherwise acquired. The gain profile includes a plurality of gain values for a corresponding plurality of travel times in ultrasonic echoes 14 reflected by a defect-free reference object, either by a rear surface of the reference object or by flat bottom holes present in the reference object. The gain values in the gain profile may for example vary according to depths of ultrasonic signal reflectors in the reference object.

In an embodiment, operation 505 may include sub-operations 506 and 507. Sub-operation 506 comprises sending an ultrasonic probe signal from the probe 220 of the scanning apparatus 200 toward a plurality of points 252 on an impinging surface 254 of the reference object 250. Sub-operation 507 comprises defining the gain profile based on ultrasonic echoes 14 received from the plurality of points 252 (or 258 in pitch and catch mode) on the impinging surface of the reference object 250. If the scanning apparatus 200 comprises a plurality of probes, a plurality of gain profiles may be defined at operation 505. For example, one gain profile may be defined for each of a plurality of probes. In such case, sub-operation 506 may comprise sending an ultrasonic probe signal from each of the plurality of probes toward a plurality of points 252 on the impinging surface of the reference object 250 and sub-operation 507 may comprise defining, for each given probe, a gain profile for each ultrasonic echo 14 received from the plurality of points 252 or 254 on the impinging surface of the reference object 250. Multiple ultrasonic echoes 14 may be acquired at a given probe from a given point on the impinging surface of the reference object. The gain profile may be defined by averaging a number of gain values determined for the given probe for the given point.

Regardless of the manner in which the gain profile (or plurality of gain profiles) is defined or otherwise acquired at operation 505, the following operations relate to the evaluation of a test object. Operation 510 comprises receiving an initial ultrasonic signal trigger at the acquisition unit 290. Having received the initial ultrasonic signal trigger at operation 510, the pulser 302 (FIG. 7) of the acquisition unit 290 sends an electrical pulse to the probe 220, which sends an initial ultrasonic probe signal toward the test object at operation 515. If the scanning apparatus 200 comprises a plurality of probes, a plurality of initial ultrasonic signal triggers may be received by the acquisition unit at operation 510, each of which causing a respective initial ultrasonic probe signal to be sent from a corresponding one of the plurality of probes toward a corresponding point on the impinging surface of the test object at operation 515.

For a given initial ultrasonic probe signal sent toward the test object at operation 515, the probe 220 receives an initial ultrasonic echo 14 reflected by the test object at operation 520. Referring again to FIG. 1, considering one such initial ultrasonic echo 14, this signal may include a first plurality of amplitude values distributed over time. The initial ultrasonic echo 14 is digitized at operation 525. The ultrasonic scanner 200 then estimates a time of arrival (TOA$_E$) 26 of the digitized initial ultrasonic echo 14 at operation 530. Noise that may be present in the initial ultrasonic echo 14 may cause the TOA$_E$ 26 to be imprecise. To prevent a false detection of the initial ultrasonic echo 14, the TOA$_E$ 26 may be estimated as the time when a first one of a first plurality of amplitude values reaches a threshold value. This threshold value, for example the amplitude 24 of the time gate 20, may be applied to the initial ultrasonic echo 14 in a time range determined according to an expected time of arrival of the initial ultrasonic echo 14, the time range corresponding to the duration 22 of the time gate 20. The duration 22 of the time 20 is selected to capture the early part of the initial ultrasonic echo 14 for a broad range of delays between the initial ultrasonic probe signal 12 and the onset 18 of the initial ultrasonic echo 14.

The first received amplitude values of the initial ultrasonic echo 14, starting from the onset 18, are values that are least attenuated from the initial ultrasonic probe signal 12 sent toward the test object. Should the TOA$_E$ be selected at an earlier time than the onset 18, for example the time corresponding to the beginning of the time gate 20, the amplification of the initial ultrasonic echo could be maximized, but might cause a saturation of an analog amplifier (shown in later Figures) used to amplify the initial ultrasonic echo 14. Therefore, in an embodiment, the estimated time of arrival (TOA$_E$) may be selected to start somewhat later than the onset 18 of the initial ultrasonic echo 14, for example the time corresponding to the end of the time gate 20, thereby minimizing risks of saturation when the initial ultrasonic echo 14 is amplified using the aligned gain profile. However, if the analog amplifier does not have a wide dynamic range, setting the TOA$_E$ later may result in quantization noise if high numerical amplification gain is needed to complete the analog amplification. Therefore, in another embodiment, the estimated time of arrival TOA$_E$ may be set closer to the onset 18, being thus selected to maximize the amplification of the initial ultrasonic echo 14.

Figure 5A:
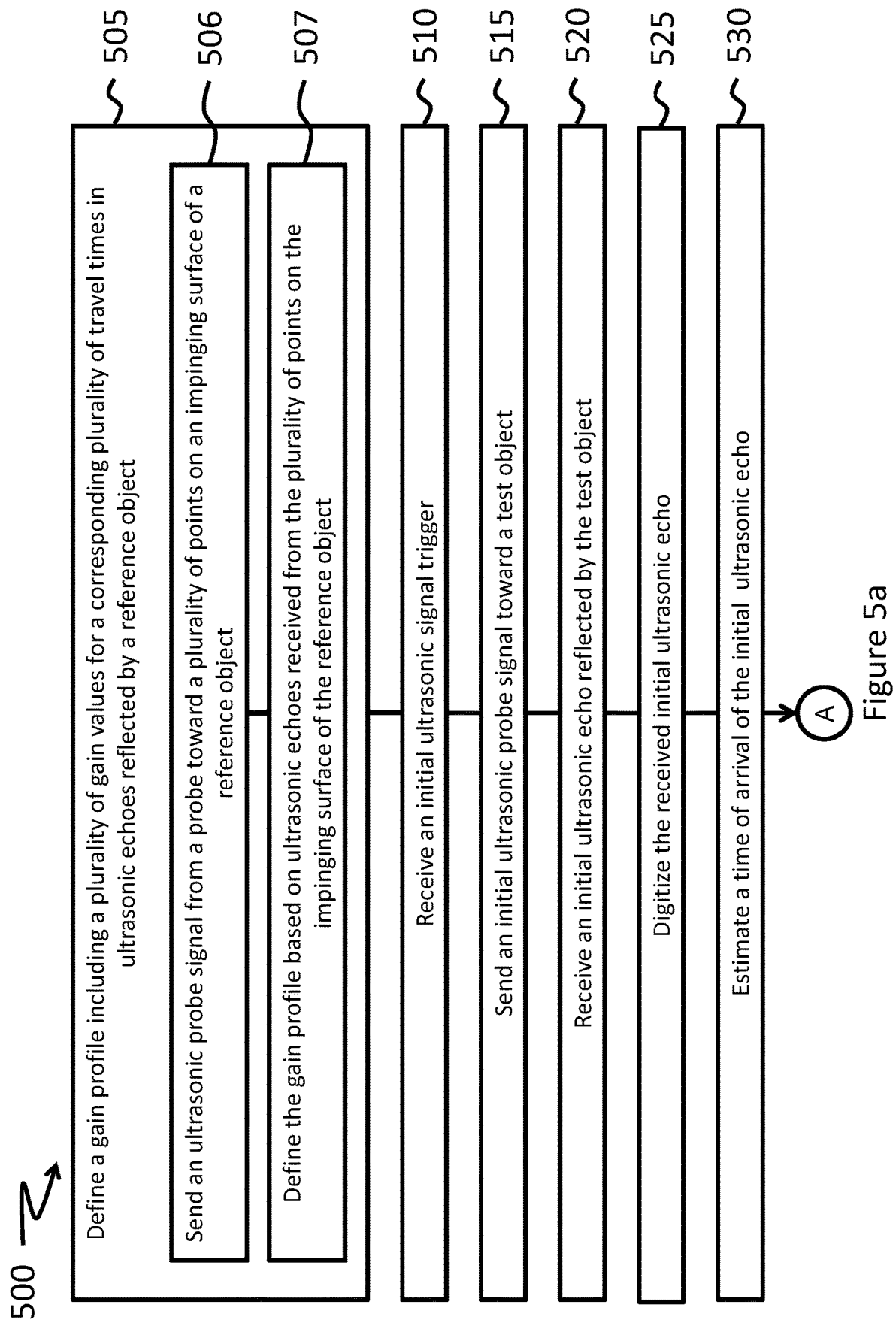
FIGS. 5a, 5b, 5c and 5d show a flowchart showing operations of a time-corrected gain method implemented in an ultrasonic scanner according to an embodiment.
Figure 5B:
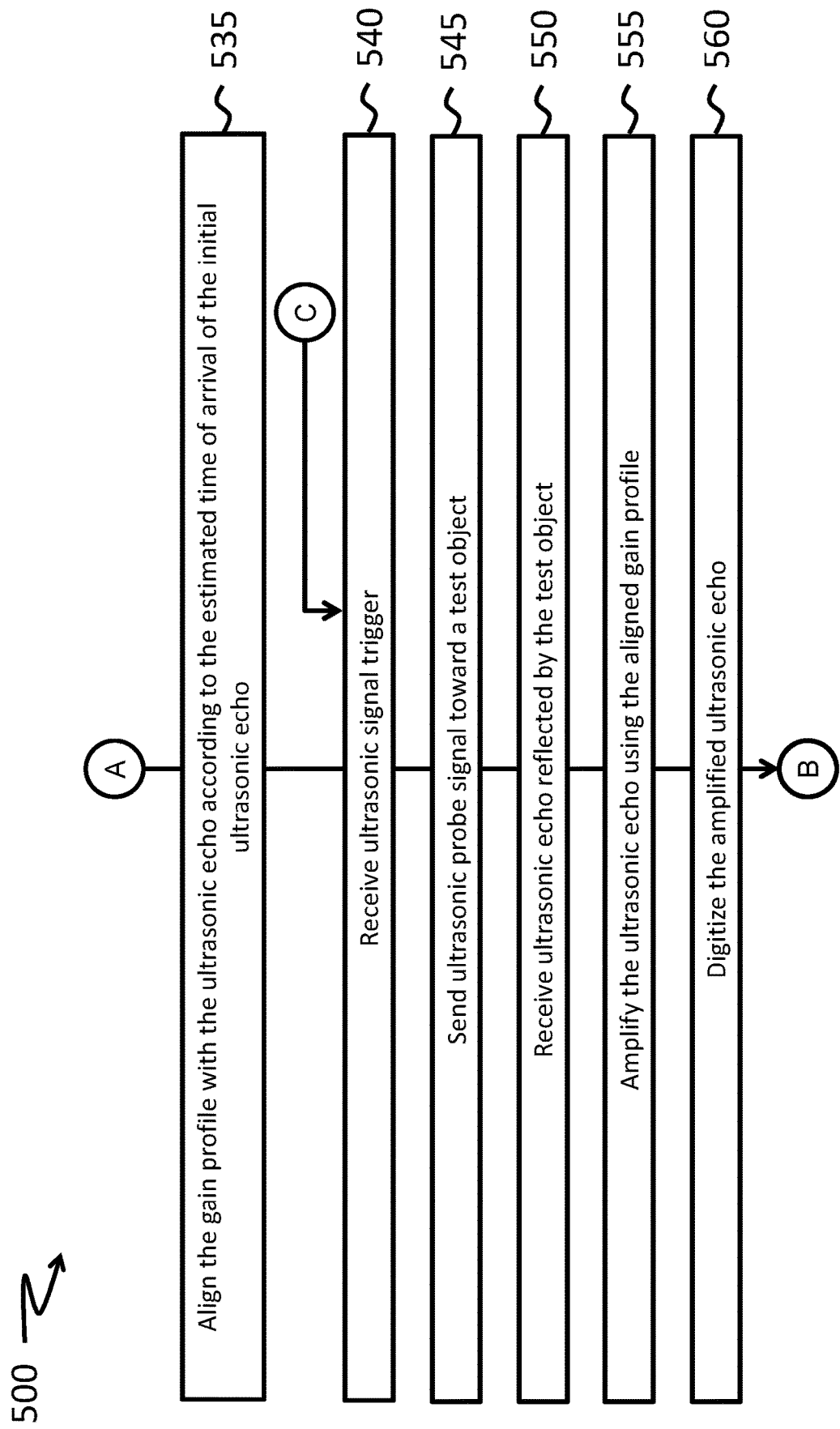
Figure 5C:
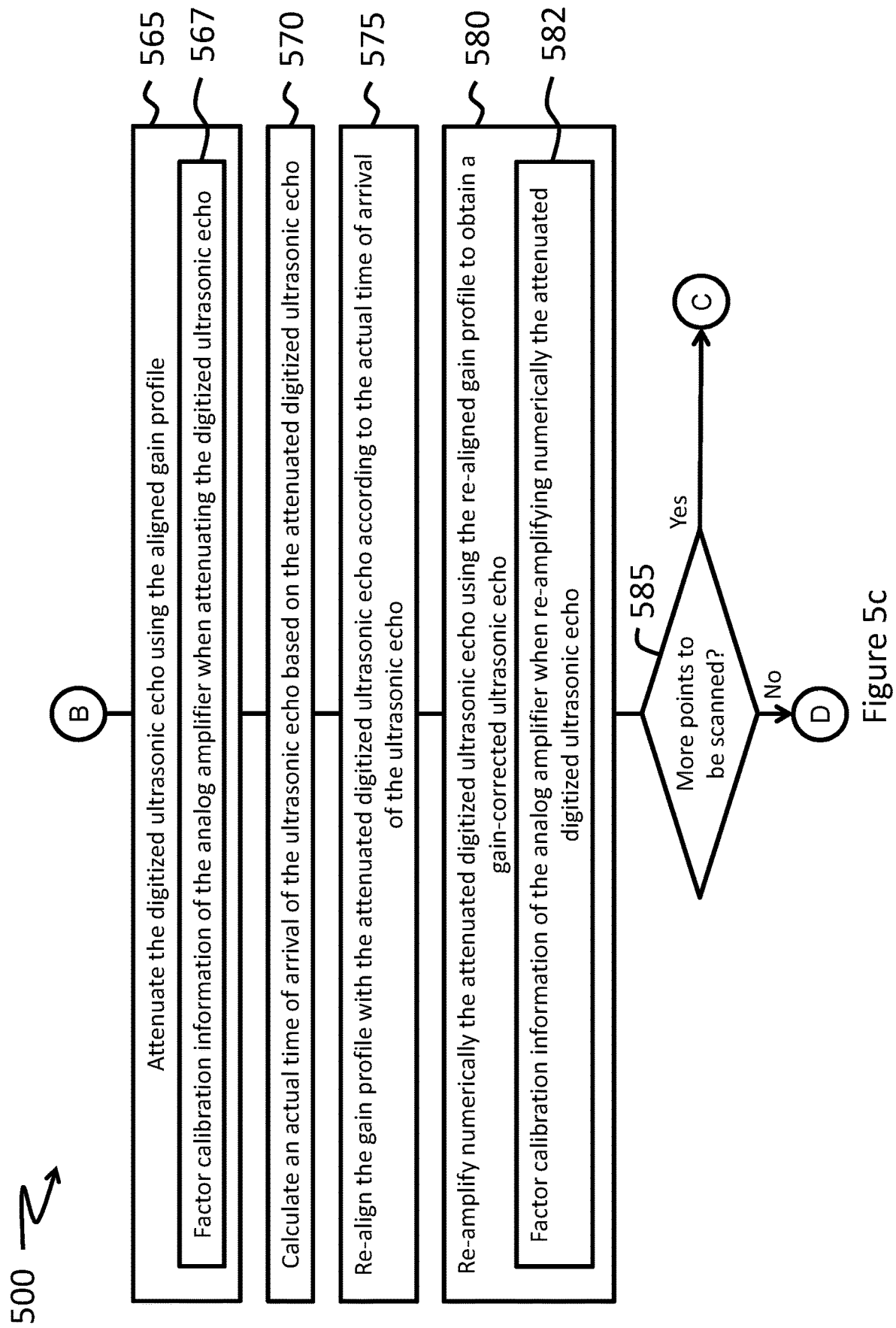
Figure 7:
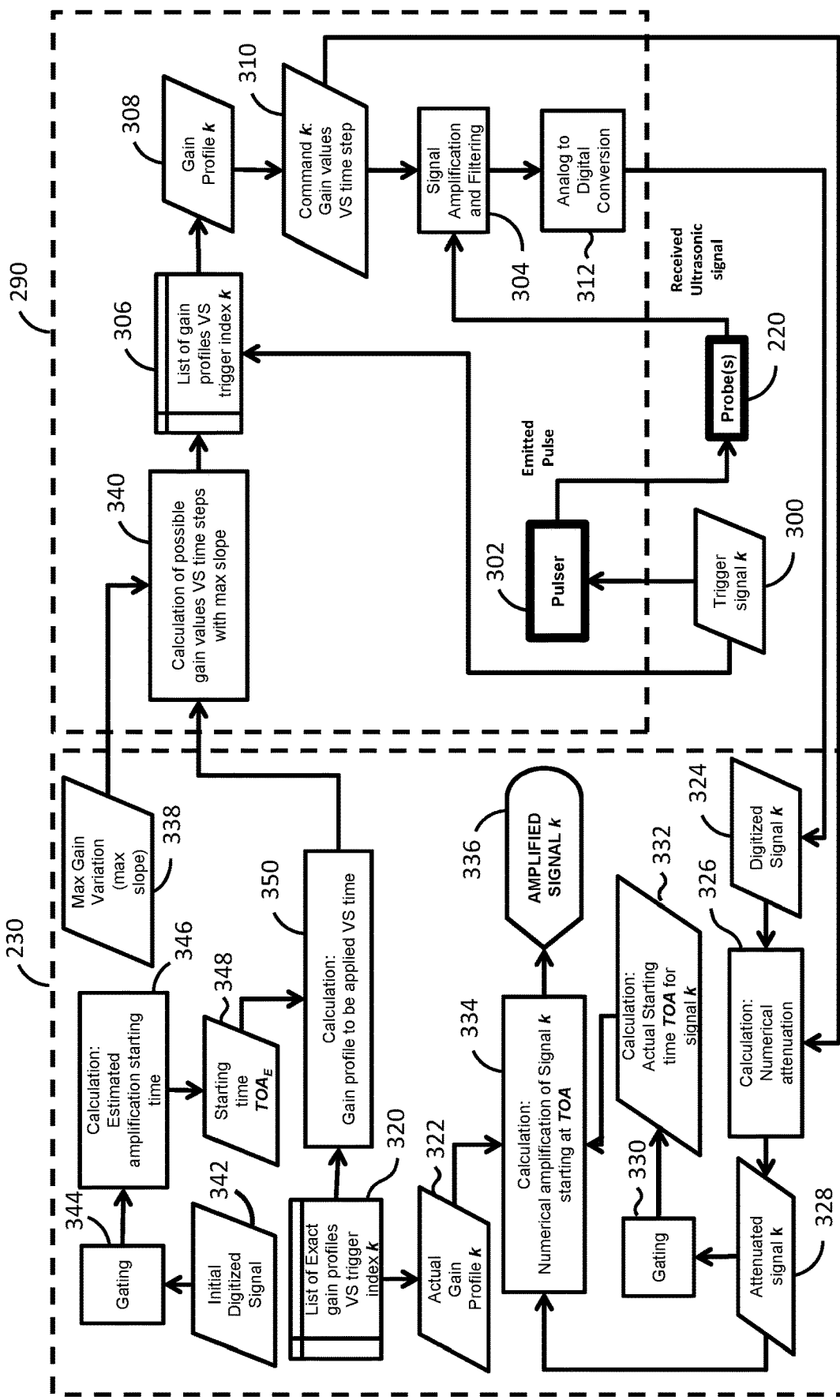
FIG. 7 is a detailed block diagram of the ultrasonic scanner of FIG. 3 showing components for controlling the acquisition and treatment of information.

Continuing on FIG. 5b, at operation 535, the gain profile is aligned with the initial ultrasonic echo 14 according to the estimated time of arrival (TOA$_E$) of the initial ultrasonic echo 14. Thereafter, the gain profile being properly aligned, a loop is initiated in which ultrasonic signal triggers are defined for a corresponding plurality of scanning points on an impinging surface of the test object, the ultrasonic signal triggers being received at the pulser 302 (FIG. 7) of the acquisition unit 290. The pulser 302 sends an electrical pulse to the probe 220 for each ultrasonic signal trigger received. If the scanning apparatus 200 comprises a plurality of probes, a plurality of ultrasonic signal triggers may be defined for a corresponding plurality of combinations between the plurality of probes and the plurality of scanning points on the impinging surface of the test object and each probe may receive electrical pulses from the pulser 302 according to the corresponding set of ultrasonic signal triggers. Considering one probe 220 for simplicity, the probe 220 may successively send, for each of a plurality of ultrasonic signal triggers, an ultrasonic probe signal toward a corresponding point on the impinging surface of the test object. To this end, operation 540 comprises receiving an ultrasonic signal trigger by the acquisition unit 290, for a given point on the impinging surface of the test object. An ultrasonic probe signal is sent by the probe 220 toward the given point on the test object at operation 545. An ultrasonic echo reflected by the given point of the test object is received at operation 550. At operation 555, the ultrasonic echo 14 is amplified using the aligned gain profile. This operation 555 may comprise amplifying each one of a first plurality of amplitude values with a corresponding one of the gain values of the aligned gain profile. This amplification is performed in analog mode by an analog amplifier 304 (FIG. 7). Analog amplification is less noisy than digital (or software) amplification because some of the noise generated within the amplification and filtering circuitry 304 that receives the ultrasonic echo is not amplified by the analog amplification, as would be the case if digital amplification was used. Quantization noise is also not amplified by an analog amplification while it would be amplified with a numerical amplification. Hence some noise sources are avoided by the analog amplification. As a result, the amplified ultrasonic echo benefits from a better signal to noise ratio (SNR) when compared to using a numerical amplification of the ultrasonic echo 14.

The amplified ultrasonic echo is digitized at operation 560. Then, as shown on FIG. 5c at operation 565, the digitized ultrasonic echo is attenuated numerically using the aligned gain profile. In an embodiment, operation 565 may include sub-operation 567, which comprises factoring calibration information of the analog amplifier 304 when attenuating the digitized ultrasonic echo. As expressed in more details below, the calibration information is useful in correcting differences between theoretical and actual gain characteristics of the analog amplifier 304. This operation 565 may be performed by attenuating each one of a third plurality of amplitude values of the digitized ultrasonic echo with a corresponding one of the gain values of the aligned gain profile. The attenuated digitized ultrasonic echo obtained at operation 565 includes a second plurality of amplitude values distributed over time.

The attenuation applied at operation 565 is the opposite of the amplification applied at operation 555, the same aligned gain profile being used in the amplification and attenuation processes. However, the SNR improvement brought by the analog amplification performed at operation 555 is maintained in the attenuated digitized ultrasonic echo. The actual TOA of the ultrasonic echo 14 can be calculated from the actual signal to be amplified using the TCG technique at this point, instead of relying on the $TOA_E$ obtained from operation 530. An actual TOA 26 of the ultrasonic echo 14 is calculated at operation 570 based on the attenuated digitized ultrasonic echo. The attenuated digitized ultrasonic echo is the digital equivalent of the analog signal that is received at operation 550. The attenuated digitized ultrasonic echo however presents a higher vertical resolution than a signal that would have been digitized without performing operations 555 to 565. A more precise determination of the actual TOA of the ultrasonic echo 14 is therefore possible at this point. Operation 570 is similar to operation 530 in that the actual time of arrival of the ultrasonic echo 14 is defined as a time when a first amplitude value of the second plurality of amplitude values reaches the threshold value. However a key distinction of operation 570, when compared with operation 530, is that the threshold value is applied on the actual signal that is being amplified using the TCG technique. The threshold value may be applied in the same time range as when determining the estimated TOA 26 at operation 530.

At operation 575, the gain profile is re-aligned with the attenuated digitized ultrasonic echo 14, this time using to the actual TOA 26 of the ultrasonic echo 14 determined at operation 570. The attenuated digitized ultrasonic echo is re-amplified numerically at operation 580, using the re-aligned gain profile to obtain a gain-corrected ultrasonic echo. Re-amplifying the attenuated digitized ultrasonic echo at operation 580 may comprise amplifying each one of the second plurality of amplitude values with a corresponding one of the gain values of the re-aligned gain profile. In an embodiment, operation 580 may include sub-operation 582, which comprises factoring the calibration information of the analog amplifier 304 when re-amplifying the attenuated digitized ultrasonic echo. It may be noted that sub-operations 567 and 582 are present in distinct embodiments.

In an embodiment comprising a plurality of probes, a plurality of ultrasonic signal triggers is received at operation 540 and a corresponding plurality of ultrasonic probe signals are sent from the plurality of probes toward the given point on the impinging surface of the test object at operation 545. Gain-corrected echoes are calculated at operation 580 based on the ultrasonic echoes received in response to the ultrasonic probe signals. Multiple ultrasonic echoes may be acquired at a given probe from a given point on the impinging surface of the test object. Amplitude values of the multiple ultrasonic echoes may be averaged to obtain a corresponding gain-corrected echo for the given probe for the given point.

Operation 585 determines whether there are more points to be scanned on the impinging surface of the test object. If so, the sequence 500 returns to operation 540 where another ultrasonic signal trigger is received for another scanning point. Generally, small movements of the probe 220 while scanning various points on the surface of the test object will not have a significant impact on the time of arrival of ultrasonic echoes and on the alignment of the gain profile. However, in an embodiment, after operation 585, the sequence 500 may return to operation 510 after a predetermined number of iterations of operations 540-580 in order to refresh the estimation of the time of arrival ($TOA_E$) at operation 530 and to re-align the gain profile with a new initial ultrasonic echo 14 according to the refreshed $TOA_E$ of the initial ultrasonic echo 14 at operation 535.

Figure 5D:
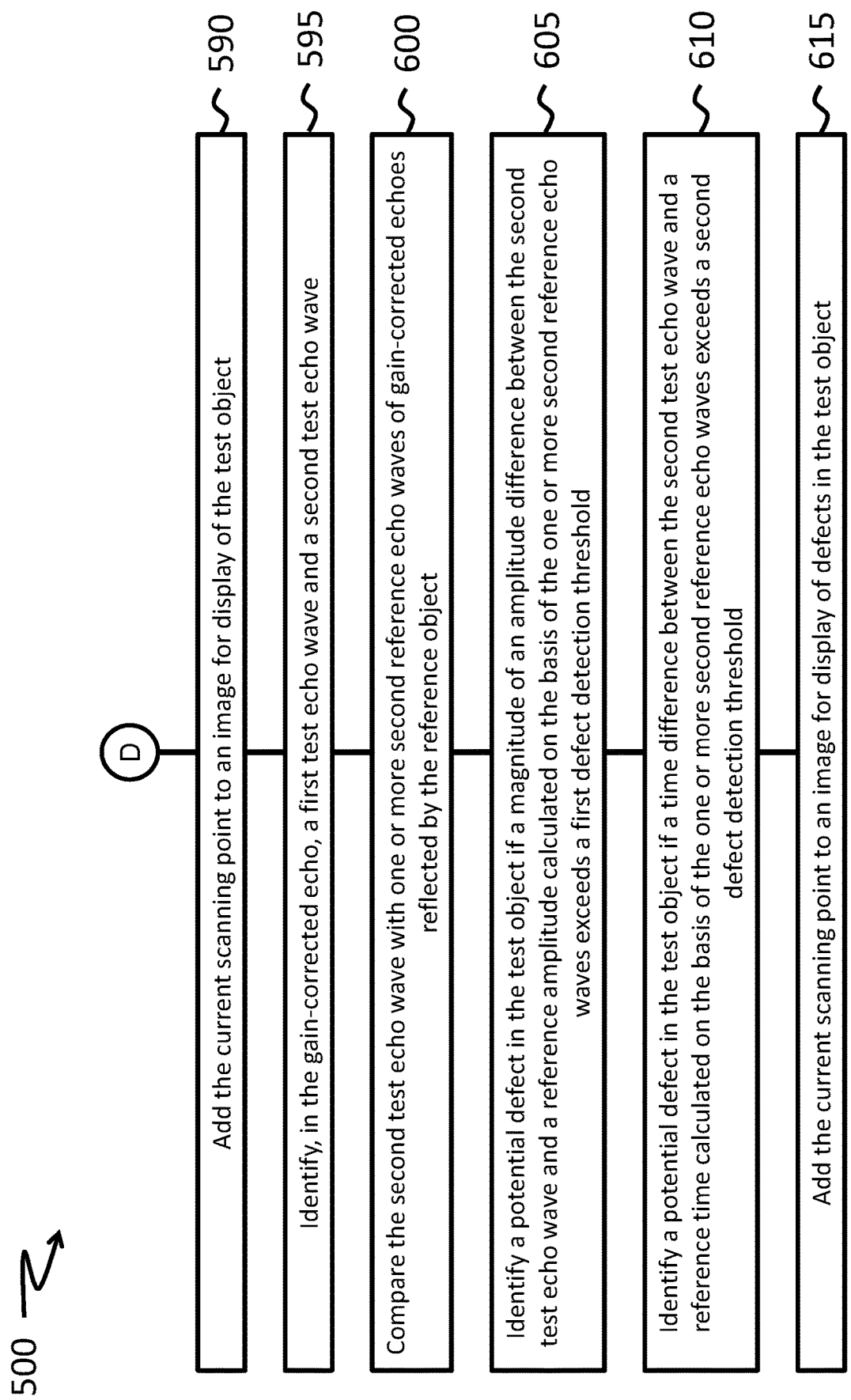

If there is no more point to be scanned, the sequence 500 continues at operation 590, which is shown on FIG. 5d, in which the current scanning point is added to an image for display of the test object.

Gain-corrected echoes may thus be obtained at operation 580 for a plurality of points on the impinging surface of the test object. C-scan images of the test object may be generated on the basis of the gain-corrected echoes and may be displayed by the controller 230 of the scanning apparatus 200 on the monitor 232 following operation 590.

At operation 595, for a given ultrasonic echo 14, a first test echo wave and a second test echo wave are identified within a corresponding gain-corrected echo. In line with the illustration of FIG. 1, the first test echo wave is based on a reflection of a respective ultrasonic probe signal 14 on the impinging surface of the test object and the second test echo wave is based on a reflection of the respective ultrasonic probe signal against an impedance discontinuity in the test object caused by the ultrasonic probe signal reaching the rear surface of the test object or a defect or other artifact within the test object. It may happen that the second test echo wave cannot be identified; this may be the case for example when a thickness of the test object is such that a reflection from the rear surface of the test object is so attenuated that it cannot be detected from the noise in the ultrasonic echo 14. A solution to this problem may be to reduce a frequency of the ultrasonic probe signal; however, the entire sequence 500 may need to be executed again to define a gain profile consistent with the reduced frequency of the ultrasonic probe signal.

First and second reference echo waves have been acquired from a gain-corrected echo reflected by the reference object, which is free of any natural defect. Generally speaking, the first reference echo wave is caused by a reflection of an ultrasonic probe signal on the impinging surface of the reference object; a first test echo wave caused by a reflection of an ultrasonic probe signal on the impinging surface of the test object should be very similar, unless a defect is present on the impinging surface of the test object. Also generally speaking, the second reference echo wave is caused by a reflection of the ultrasonic probe signal on a known artefact such as a machined flat bottom hole (not a defect) within the reference object. If the test object is free of any defect, there should not be any second test echo wave corresponding to the TOA of the second reference echo wave.

At operation 600, the second test echo wave of the gain-corrected echo may be compared with one or more second reference echo waves of gain-corrected echoes reflected by the reference object. A potential defect in the test object may be identified at operation 605 if a magnitude of an amplitude difference between the second test echo wave and a reference amplitude calculated on the basis of the one or more second reference echo waves exceeds a first defect detection threshold. Alternatively or in addition, a potential defect in the test object may be identified at operation 610 if a time difference between the second test echo wave and a reference time calculated on the basis of the one or more second reference echo waves exceeds a second defect detection threshold.

Operations 595 and 600, with one or both of operations 605 and 610, may be executed for each one of a plurality of scanning points on the impinging surface of the test object. Results from these operations, including the visualization of one or more potential defects in the test object, may be displayed by the controller 230 of the scanning apparatus 200 on the monitor 232 at operation 615, for example by highlighting, on the image generated at operation 590, the points on the impinging surface of the test object where the potential defects are identified.

Figure 6:
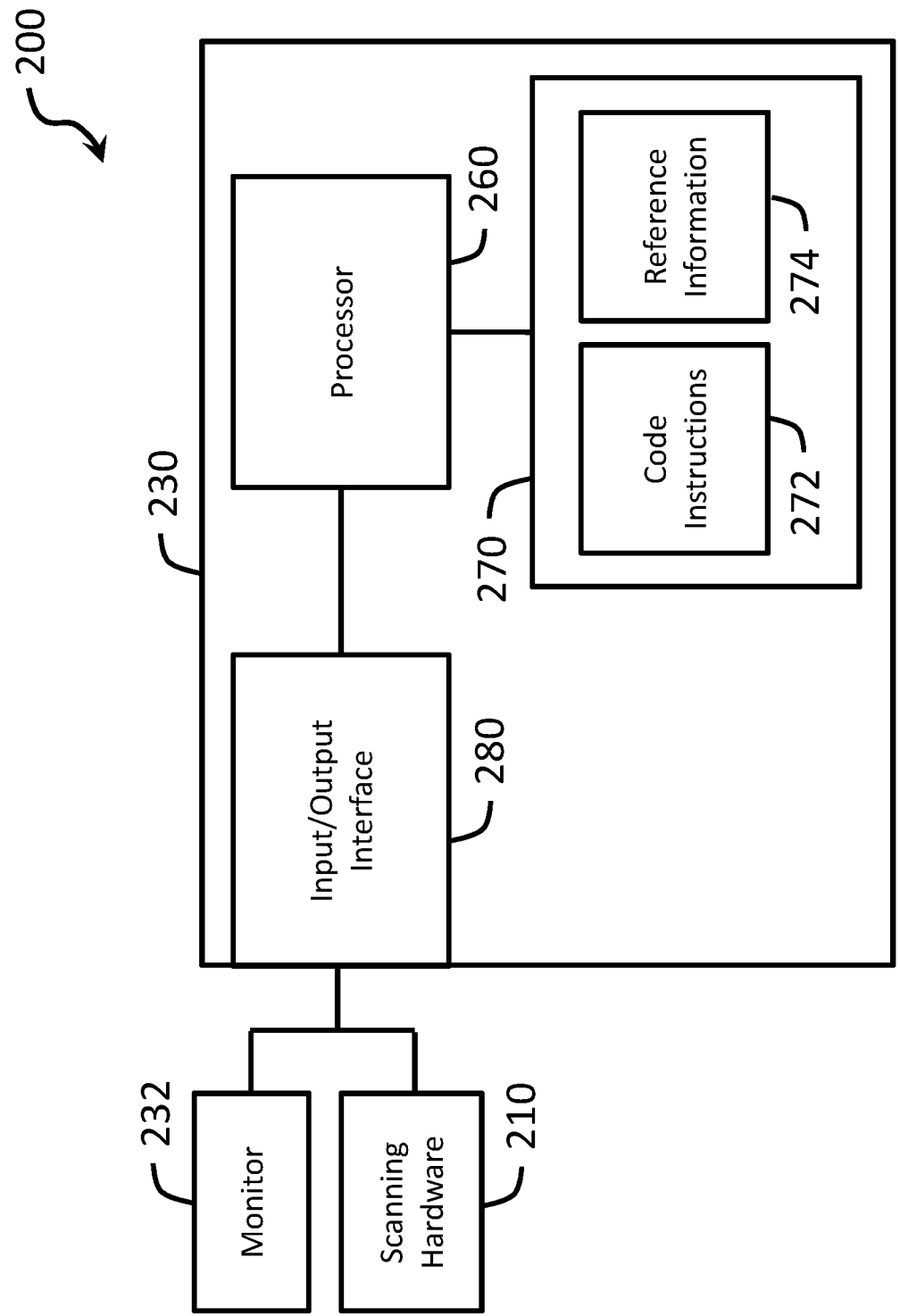
FIG. 6 is a block diagram of the ultrasonic scanner of FIG. 3.

Many of the operations of the sequence 500 may be configured to be processed by one or more processors of the controller 230, the one or more processors being coupled to one or more memory devices of the controller 230. For example, FIG. 6 is a block diagram of the ultrasonic scanner of FIG. 3. The ultrasonic scanner 200 comprises the scanning hardware 210, the data acquisition unit 290, the controller 230 and the monitor 232. FIG. 6 illustrates a non-limiting example in which the features of the data acquisition unit 290 are integrated within the controller 230.

The controller 230 comprises a processor 260 (or a plurality of cooperating processors) operatively connected to a memory device 270 (or a plurality of cooperating memory devices) and to an input/output interface 280. The memory device 270 contains a non-transient memory 272 storing computer instructions that, when executed by the processor 260, allows the controller 230 to execute various operations of the sequence 500 (FIGS. 5*a*, 5*b*, 5*c* and 5*d*). The memory device 270 also stores a table 274 containing reference information. For example, the table 274 may store DAC curves 16 and/or gain profiles for one or more reference objects, for one or more probes 220. The table 274 may also store a list of trigger indexes for scanning various reference objects and test objects. The table 274 may further store configuration information related to the physical construction of the ultrasonic scanner 200.

Although the input/output interface 280 is illustrated as a single unit, the controller 230 may comprise plurality of cooperating input devices, output devices, and/or input/output devices adapted for communicating with the monitor 232 and with various components of the scanning hardware 210, using for example wired connections.

FIG. 7 is a detailed block diagram of the ultrasonic scanner of FIG. 3 showing components for controlling the acquisition and treatment of information. Main components of the ultrasonic scanner 200 are the data acquisition unit 290 and the controller 230, both of which having been described in some details in the foregoing description of other Figures.

The data acquisition unit 290 may control at least one probe 220 operating in pulse-echo mode, the probe 220 being used at once as an emitting probe 220 adapted to send ultrasonic probe signals toward the impinging surface of the test object and as a detector (detecting probe) adapted to receive an ultrasonic echo reflected by the test object. Alternatively, the emitting probe 222 may emit the ultrasonic probe signals and the detecting probe 224 may be used as the detector, the two probes 222 and 224 operating in pitch-and-catch mode. A plurality of probes may be assembled to form an array of probes. For ease of illustration, the following passages will refer to "the probe 220" in the singular form, without limiting the generality of the present disclosure.

The vertical member 212 and the horizontal beams 214 and 216 introduced in the description of FIG. 3 form a probe support adapted to position the probe 220 and the detector in view of the impinging surface of the test object.

A trigger table 300 may store a list of ultrasonic signal triggers. Alternatively, ultrasonic signal triggers may be emitted at regular intervals. In another embodiment, the data acquisition unit 290 may issue ultrasonic signal triggers by monitoring a position of the probe 220 using an encoder counter card (not shown). In yet another embodiment, a subsequent ultrasonic trigger signal may be indexed by the data acquisition unit 290 each time a new digitized ultrasonic echo signal is received. In any case, an ultrasonic signal trigger k from the trigger table 300 (or from an equivalent component of the data acquisition unit 290) is provided to a pulser 302 that generates an electrical pulse signal transmitted to the emitting probe 220. In turn, the emitting probe 220 converts the electrical pulse signal into an ultrasonic probe signal 12 emitted toward the impinging surface of the test object. An ultrasonic echo 14 received at the detecting probe 220 is applied to an analog amplifier 304 that may also implement a filtering function to reduce a noise of the ultrasonic echo.

The analog filter 304 receives a gain profile including a plurality of gain values for a corresponding plurality of travel times in ultrasonic echoes reflected by a reference object. A gain profile for the ultrasonic signal trigger k may be selected among a plurality of gain profiles. To this end, the gain profiles are stored in a gain profile table 306. The gain profile table 306 may further store first estimates of a TOA associated to the plurality of gain profiles. The trigger table 300 provides an indication of the ultrasonic signal trigger k to the gain profile table 306, allowing the selection of a corresponding gain profile and of a corresponding first estimate of the TOA. The gain profile table 306 outputs a gain profile k 308 that contains gain values $32_1 \ldots 32_i$ distributed over time delays following the TOA. The gain profile is converted into gain commands 310 distributed over time delays following reception of the ultrasonic signal trigger k.

Having converted the proper gain profile k 308 for the ultrasonic signal trigger k into gain commands 310, the gain profile k 308 being aligned with the ultrasonic echo 14 according to the estimated TOA, the analog amplifier 304 then amplifies the ultrasonic echo 14 using the gain commands 310.

An analog to digital converter 312 digitizes the amplified ultrasonic echo from the analog amplifier 304.

In the controller 230, the processor 260 implements various features as expressed in the following paragraphs, including storing and reading reference information 274 from the memory device 270. These features will now be described with reference to functional blocks shown on the left-hand part of FIG. 7.

A receiver 324 obtains the digitized amplified ultrasonic echo from the analog to digital converter 312 and supplies the same to a calculator 326. The gain command k 310 provides the gain values k including the gain values $32_1 \ldots 32_i$ distributed over time delays following the TOA that have been effectively used by the amplifier 304 to the calculator 326. In an embodiment, the values provided by the gain command k 310 further provide calibration information that may reflect actual characteristics of the analog amplifier 304, the calibration information allowing the calculator 326 to account for variations between theoretical gain values $32_1 \ldots 32_i$ and gain values that are actually applied by the amplifier 304. As an example, where a gain command value 3Z of 6 dB causes the amplifier 304 to actually amplify a sample j of the ultrasonic echo by 5.8 dB, the command k 310 may provide a value of 5.8 dB for the gain value $32_j$ to the calculator 326. The calculator 326 may thus obtain the calibration information of the analog amplifier 304 and factor the calibration information when attenuating the digitized ultrasonic echo to correct for imperfections of the analog amplifier 304.

The calculator 326 uses the aligned gain profile provided by gain command k 310 to attenuate the digitized ultrasonic echo. A resulting attenuated digitized ultrasonic echo 328 is similar to the ultrasonic echo 14 captured by the receiving probe 220 before the analog amplification, but benefits from an improved SNR because some of the noise that may be present in the ultrasonic echo 14 has been attenuated by the calculator 326 without necessarily being amplified by the analog amplifier 304. Such noise may include thermal noise originating from the analog amplifier 304. The attenuated digitized ultrasonic echo 328 is applied to a time gate 330 that calculates an actual TOA 332 of the ultrasonic echo 14. The actual TOA 332 differs from the estimated TOA used up to this point in the sense that it is obtained from the signal being processed by the TCG technique instead of the initial digitized ultrasonic echo 342 obtained at operation 525 (FIG. 5a).

The controller 230 also stores a gain profile table 320 for the various ultrasonic signal triggers. For a given reference object, the gain profile table 320 may for example store a plurality of gain profiles corresponding to a plurality of probes 220 in the data acquisition unit 290. The list of actual gain profiles k 320 differs from the list of gain profiles 306 because the list of actual gain profiles k 320 represent the expected (or ideal) gain variation while the list of gain profiles 306 represents the gain values that the analog amplifier 304 can apply. An actual gain profile 322 corresponding to the ultrasonic signal trigger k is fetched from the gain profile table 320. The actual TOA 332 and the attenuated digitized ultrasonic echo 328 are applied to a calculator 334 that re-aligns the actual gain profile 322 fetched from the gain profile table 320 with the attenuated digitized ultrasonic echo 328 according to the actual TOA 332 of the ultrasonic echo 14. The calculator 334 re-amplifies the attenuated digitized ultrasonic echo 328 using the re-aligned gain profile to obtain a gain-corrected echo 336. In an embodiment, the calibration information of the analog amplifier 304 may be used by the calculator 334 when re-amplifying the attenuated digitized ultrasonic echo 328, as an alternative to the use of the calibration information by the calculator 326.

In the controller 230, a table 338 may store a maximum gain variation that can be achieved by the analog amplifier 304 based on its specifications. This information may be provided by the controller 230 to a calculator 340 in the data acquisition unit 290. Additionally, the controller 230 may also store, in a table 342, the initial digitized ultrasonic echo obtained at operation 525 (FIG. 5a). These signals are applied to a time gate 344, similar to the time gate 330 and then to a calculator 346 that executes operation 530 of the sequence 500 to provide an estimated amplification starting time $(TOA_E)$ 348 for the reference signal obtained from the reference object or from the tested part. The starting time 348 may be calculated in view of minimizing risks of saturation of the analog amplifier 304 and/or the analog to digital converter 312 or in view of maximizing the amplification of the ultrasonic echo 14, when the analog amplifier 304 and/or the analog to digital converter 312 is known to have a limited dynamic range. The actual gain profiles from the gain profile table 320 and the starting time 348 are provided to a calculator 350 of gain profiles. The calculator 350 synchronizes the actual gain profiles of table 320 with the estimated amplification starting time 348, executing operation 535 of the sequence 500, and provides the output to the calculator 340 in the data acquisition unit. The calculator 340 uses the maximum gain variation information 338 and from the gain profiles outputted by calculator 350 to populate the gain profile table 306 that corresponds to gain values that can be controlled by the analog amplifier 304.

Those of ordinary skill in the art will realize that the description of the ultrasonic scanner and of the time-corrected gain method implemented in an ultrasonic scanner are illustrative only and are not intended to be in any way limiting. Other embodiments will readily suggest themselves to such persons with ordinary skill in the art having the benefit of the present disclosure. Furthermore, the disclosed method and ultrasonic scanner may be customized to offer valuable solutions to existing needs and problems related to synchronization of a gain profile with a time of arrival of an ultrasonic echo.

In the interest of clarity, not all of the routine features of the implementations of the method and ultrasonic scanner are shown and described. It will, of course, be appreciated that in the development of any such actual implementation of the method and ultrasonic scanner, numerous implementation-specific decisions may need to be made in order to achieve the developer's specific goals, such as compliance with application-related, system-related, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of non-destructive testing having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A time-corrected gain method implemented in an ultrasonic scanner, the method comprising:
   acquiring a gain profile including a plurality of gain values for a corresponding plurality of travel times in ultrasonic echoes reflected by a reference object;
   sending an ultrasonic probe signal toward a test object;
   receiving an ultrasonic echo reflected by the test object;
   estimating a time of arrival of the ultrasonic echo;
   aligning the gain profile with the ultrasonic echo according to the estimated time of arrival of the ultrasonic echo;
   amplifying the ultrasonic echo using the aligned gain profile;
   digitizing the amplified ultrasonic echo;
   attenuating the digitized ultrasonic echo using the aligned gain profile;
   calculating an actual time of arrival of the ultrasonic echo based on the attenuated digitized ultrasonic echo;
   re-aligning the gain profile with the attenuated digitized ultrasonic echo according to the actual time of arrival of the ultrasonic echo; and
   re-amplifying the attenuated digitized ultrasonic echo using the re-aligned gain profile to obtain a gain-corrected ultrasonic echo.

2. The method of claim 1, wherein:
   the ultrasonic echo is amplified by an analog amplifier using the aligned gain profile; and
   attenuating the digitized ultrasonic echo using the aligned gain profile is further based on calibration information of the analog amplifier.

3. The method of claim 1, wherein:
   the ultrasonic echo is amplified by an analog amplifier using the aligned gain profile; and
   re-amplifying the attenuated digitized ultrasonic echo is further based on calibration information of the analog amplifier.

4. The method of claim 1, wherein the gain values in the gain profile vary according to depths of ultrasonic signal reflectors in the reference object.

5. The method of claim 1, wherein:
   the ultrasonic echo includes a first plurality of amplitude values distributed over time;
   the attenuated digitized ultrasonic echo includes a second plurality of amplitude values distributed over time;
   the estimated time of arrival of the ultrasonic echo is defined as a time when a first one of the first plurality of amplitude values reaches a threshold value; and
   the actual time of arrival of the ultrasonic echo is defined as a time when a first amplitude value of the second plurality of amplitude values reaches the threshold value.

6. The method of claim 5, further comprising applying the threshold value to the ultrasonic echo in a time range determined according to an expected time of arrival of the ultrasonic echo.

7. The method of claim 5, wherein:
   amplifying the ultrasonic echo using the aligned gain profile comprises amplifying each one of the first plurality of amplitude values with a corresponding one of the gain values of the aligned gain profile;
   attenuating the digitized ultrasonic echo using the aligned gain profile comprises attenuating each one of a third plurality of amplitude values of the digitized ultrasonic echo with a corresponding one of the gain values of the aligned gain profile; and
   re-amplifying the attenuated digitized ultrasonic echo using the re-aligned gain profile comprises amplifying each one of the second plurality of amplitude values with a corresponding one of the gain values of the re-aligned gain profile.

8. The method of claim 1, wherein the ultrasonic signal is sent toward the test object in response to receiving an ultrasonic signal trigger.

9. The method of claim 8, further comprising:
   defining a plurality of ultrasonic signal triggers for a corresponding plurality of points on an impinging surface of the test object; and
   sending, for each of the plurality of ultrasonic signal triggers, an ultrasonic probe signal toward a corresponding point on the impinging surface of the test object to obtain a corresponding gain-corrected echo for the corresponding point on the impinging surface of the test object.

10. The method of claim 9, further comprising displaying an image of the test object based on a plurality of gain-corrected echoes for the plurality of points on the impinging surface of the test object.

11. The method of claim 8, further comprising:
   defining a plurality of gain profiles, one gain profile being defined for each of a plurality of probes adapted to emit ultrasonic signals toward the reference object and toward the test object; and
   defining a plurality of ultrasonic signal triggers for a corresponding plurality of combinations between the plurality of probes and a plurality of points on an impinging surface of the test object.

12. The method of claim 1, further comprising:
sending an initial ultrasonic probe signal toward a first one of a plurality of points on an impinging surface of the test object;
receiving an initial ultrasonic echo reflected by the first one of the plurality of points on the impinging surface of the test object; and
digitizing the received initial ultrasonic echo;
wherein:
the time of arrival is estimated for the digitized initial ultrasonic echo, and
the gain profile is aligned with the digitized initial ultrasonic echo according to the time of arrival estimated for the digitized initial ultrasonic echo.

13. An ultrasonic scanner, comprising:
a probe adapted to send an ultrasonic probe signal toward an impinging surface of a test object;
a detector adapted to receive an ultrasonic echo reflected by the test object;
a probe support adapted to position the probe and the detector in view of the impinging surface of the test object;
an analog amplifier adapted to:
receive a gain profile including a plurality of gain values for a corresponding plurality of travel times in ultrasonic echoes reflected by a reference object,
align the gain profile with the ultrasonic echo according to an estimated time of arrival of the ultrasonic echo, and
amplify the ultrasonic echo using the aligned gain profile;
an analog to digital converter adapted to digitize the amplified ultrasonic echo; and
a controller operably connected to the probe, to the detector, to the probe support, to the analog amplifier, and to the digital to analog converter, the controller being configured to:
implement a time gate to estimate the time of arrival of the ultrasonic echo at the detector,
provide the gain profile and the estimated time of arrival of the ultrasonic echo to the analog amplifier,
cause the probe to send the ultrasonic probe signal toward the impinging surface of the test object,
receive the digitized amplified ultrasonic echo from the analog to digital converter,
align the gain profile with the digitized ultrasonic echo according to the estimated time of arrival of the ultrasonic echo,
attenuate the digitized ultrasonic echo using the aligned gain profile,
calculate an actual time of arrival of the ultrasonic echo based on the attenuated digitized ultrasonic echo,
re-align the gain profile with the attenuated digitized ultrasonic echo according to the actual time of arrival of the ultrasonic echo, and
re-amplify the attenuated digitized ultrasonic echo using the re-aligned gain profile to obtain a gain-corrected ultrasonic echo.

14. The ultrasonic scanner of claim 13, further comprising an analog filter adapted to reduce a noise of the ultrasonic echo.

15. The ultrasonic scanner of claim 13, wherein the controller is further configured to:
receive calibration information of the analog amplifier; and
factor the calibration information of the analog amplifier when attenuating the digitized ultrasonic echo.

16. The ultrasonic scanner of claim 13, wherein the controller is further configured to:
receive calibration information of the analog amplifier; and
factor the calibration information of the analog amplifier when re-amplifying the attenuated digitized ultrasonic echo.

17. The ultrasonic scanner of claim 13, further comprising:
a trigger table storing a list of ultrasonic signal triggers;
a pulser receiving the ultrasonic signal triggers and causing the probe to send a given ultrasonic probe signal toward the impinging surface of the test object for a given ultrasonic signal trigger; and
a gain profile table storing one or more gain profiles and one or more associated first estimates of the time of arrival for the reference object, the gain profile table receiving an indication of the given ultrasonic signal trigger from the trigger table and selecting, for the given ultrasonic signal trigger, a given gain profile among the one of more gain profiles and a corresponding given first estimate of the time or arrival among the one or more first estimates of the time of arrival;
wherein the time gate uses the given first estimate of the time of arrival to estimate the time of arrival of the ultrasonic echo at the detector; and
wherein the analog amplifier amplifies the given ultrasonic echo responsive to the given ultrasonic signal trigger using the given gain profile.

18. The ultrasonic scanner of claim 17, wherein the controller is further configured to:
store the one of more gain profiles;
receive the indication of the given ultrasonic signal trigger;
select the given gain profile among the one of more gain profiles for the given ultrasonic signal trigger;
wherein the given gain profile is used to:
align the gain profile with the digitized ultrasonic echo according to the estimated time of arrival of the ultrasonic echo,
attenuate the digitized ultrasonic echo using the aligned gain profile,
re-align the gain profile with the attenuated digitized ultrasonic echo according to the actual time of arrival of the ultrasonic echo, and
re-amplify numerically the attenuated digitized ultrasonic echo using the re-aligned gain profile to obtain a gain-corrected echo.

19. The ultrasonic scanner of claim 17, wherein the controller is further configured to:
store the one of more gain profiles for the reference object;
store the one or more first estimates of the time of arrival for the reference object; and
provide the one of more gain profiles and the one or more first estimates of the times of arrival to the gain profile table.

20. The ultrasonic scanner of claim 13, further comprising a monitor, the controller being further configured to:
    cause the probe to send a plurality of ultrasonic probe signals toward a corresponding plurality of points on the impinging surface of the test object;
    form an image of the test object using a plurality of gain-corrected echoes obtained based on a plurality of ultrasonic echoes received from the plurality of points on the impinging surface of the test object; and
    cause the monitor to display the image of the test object.

\* \* \* \* \*